United States Patent
Sahota

(10) Patent No.: US 12,435,735 B2
(45) Date of Patent: Oct. 7, 2025

(54) TURBOMACHINE HAVING A FLOW DUCT

(71) Applicant: MTU Aero Engines AG, Munich (DE)

(72) Inventor: Harsimar Sahota, Unterschleissheim (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 19/048,008

(22) Filed: Feb. 7, 2025

(65) Prior Publication Data

US 2025/0243876 A1 Jul. 31, 2025

(30) Foreign Application Priority Data

Feb. 21, 2024 (DE) .......................... 102024104891.3

(51) Int. Cl.
  F04D 29/54 (2006.01)
(52) U.S. Cl.
  CPC ......... F04D 29/547 (2013.01); F04D 29/542 (2013.01)
(58) Field of Classification Search
  CPC .............................. F04D 29/547; F04D 29/542
  See application file for complete search history.

(56) References Cited

U.S. PATENT DOCUMENTS

| | | | |
|---|---|---|---|
| 6,666,017 B2 | 12/2003 | Prentice et al. | |
| 9,222,437 B2 * | 12/2015 | Machnaim | F01D 9/02 |
| 9,534,497 B2 * | 1/2017 | Kuchana | F01D 5/145 |
| 10,344,602 B2 * | 7/2019 | Hura | F01D 25/162 |
| 10,815,888 B2 | 10/2020 | Merry et al. | |
| 2010/0170224 A1 | 7/2010 | Clark et al. | |
| 2012/0275922 A1 * | 11/2012 | Praisner | F01D 5/143 |
| | | | 416/223 A |
| 2014/0086739 A1 * | 3/2014 | Machnaim | F02K 3/065 |
| | | | 29/889.22 |
| 2019/0226359 A1 * | 7/2019 | Hase | F02C 7/00 |
| 2020/0232392 A1 | 7/2020 | Bousfield et al. | |

FOREIGN PATENT DOCUMENTS

EP 1887199 A2 2/2008
EP 3557027 A1 10/2019

* cited by examiner

*Primary Examiner* — Nathaniel E Wiehe
*Assistant Examiner* — Theodore C Ribadeneyra
(74) *Attorney, Agent, or Firm* — Davidson Kappel LLC

(57) ABSTRACT

A turbomachine (10) having a flow duct (11) with an annular inlet opening (31) and an annular outlet opening (41), the inlet opening (31) and the outlet opening (41) being connected by an inner and an outer circumferential surface (24, 25), which radially bound the flow duct (11), the flow duct (11) having a plurality of circumferentially distributed radially extending struts (21) whose leading edges (21a) are spaced a distance ($D_1$) apart from trailing edges (22b) of upstream guide vanes (22) and whose trailing edges (21b) are spaced a distance ($D_2$) apart from leading edges (23a) of downstream guide vanes (23).

18 Claims, 3 Drawing Sheets

TURBOMACHINE HAVING A FLOW DUCT

The invention relates to a turbomachine having a flow duct with an annular inlet opening and an annular outlet opening, the inlet opening and the outlet opening being connected by an inner circumferential surface and an outer circumferential surface, which radially bound the flow duct, the flow duct having a plurality of circumferentially distributed radially extending struts disposed between upstream and downstream guide vanes.

BACKGROUND

Turbomachines, such as those used in flight propulsion systems, generally have a plurality of compressors, a plurality of turbines, and a combustor. Generally, the plurality of compressors includes a low-pressure compressor and a high-pressure compressor, while the plurality of turbines includes a high-pressure turbine and a low-pressure turbine. The flow through the turbomachine is in an axial direction. The low-pressure compressor is positioned upstream of the high-pressure compressor, and the high-pressure turbine is positioned upstream of the low-pressure turbine. A transition duct may be disposed, for example, between the low-pressure compressor and the high-pressure compressor to guide the flow between these two compressors. Likewise, such a transition duct may be positioned between the high-pressure turbine and the low-pressure turbine. Flow guidance of a gas stream within the turbomachine, and thus also in such a transition duct, can in particular have favorable effects on an efficiency of the turbomachine.

SUMMARY OF THE INVENTION

In view of the above, it is an object of the present invention to provide an improved turbomachine, in particular for a flight propulsion system. In particular, the turbomachine is intended to permit a reduction in the overall length and/or to enable an improvement in efficiency.

The present invention provides a turbomachine, in particular for a flight propulsion system, which turbomachine has a flow duct with an annular inlet opening and an annular outlet opening, the inlet opening and the outlet opening being connected by an inner circumferential surface and an outer circumferential surface, which radially bound the flow duct. The flow duct has a plurality of circumferentially distributed radially extending struts whose leading edges are spaced a distance apart from trailing edges of upstream guide vanes and whose trailing edges are spaced a distance apart from leading edges of downstream guide vanes. The inlet opening and the outlet opening of the flow duct are respectively located at half the distance between the leading and trailing edges of the struts and the leading and trailing edges of the adjacent guide vanes along a meanline geometry extending between the guide vanes, each point of the meanline geometry being equidistant from the inner and outer circumferential surfaces in a direction perpendicular to the meanline geometry. An axial length of the flow duct, with respect to the axis of rotation of the turbomachine, extends axially from a point of intersection of the inlet opening with the meanline geometry to a point of intersection of the outlet opening with the meanline geometry, and a radial height of the flow duct extends radially from the point of intersection of the inlet opening with the meanline geometry to a point of intersection of the outlet opening with the meanline geometry. A length ratio of the axial length to the radial height and a cross-sectional ratio of the cross-sectional area of the inlet opening to the cross-sectional area of the outlet opening is in a range having a cross-sectional ratio of between about 1 and about 1.2 and a length ratio of between about 0.9 and about 1.5.

The values proposed herewith for the length ratio make it possible for the flow duct to have a relatively steep or aggressive slope, which permits a reduction in the overall length, and the values proposed for the cross-sectional ratio make it possible to provide an, in particular predetermined, deceleration of a gas stream passing through the flow duct in order to reduce a risk of flow separations. Due to the reduction in the overall length of the turbomachine made possible in this way, a reduction in fuel requirements and/or an improvement in efficiency can be achieved for the turbomachine.

A turbomachine proposed herein may be intended for use in a flight propulsion system and in particular has a fan, a compressor, a combustor, and a turbine, and may be designed, for example, as a turbofan engine. Ambient air can be drawn in by the fan and compressed in the compressor in order to increase the pressure, in particular progressively, in the direction of flow. In the combustor disposed downstream of the compressor in the direction of flow through the engine, the compressed working fluid is burned with a fuel to produce combustion gases at high pressure and high temperature. The combustion gases flow as a gas stream from the combustor to the turbine, where they expand to perform work. In particular, the expansion of the combustion gases in the turbine section drives a rotor or shaft. For example, a high-pressure turbine may drive a high-pressure compressor of the compressor via a high-pressure shaft and/or a low-pressure turbine may drive the fan via a low-pressure shaft.

In an embodiment, the flow duct is configured to connect at least two components of a turbomachine through which components a gas stream can flow. Accordingly, the flow duct may be configured to connect two compressors of the turbomachine, and in particular to connect a high-pressure compressor and a low-pressure compressor of the turbomachine, disposed upstream of the high-pressure compressor in the direction of flow of the gas stream. Accordingly, the flow duct may be disposed between two components through which a gas stream can flow, between two compressors, i.e., between the low-pressure compressor and the high-pressure compressor.

The annular inlet opening is configured to, in particular smoothly, connect to the upstream component of the turbomachine, making it possible to provide for undisturbed, in particular laminar, flow guidance. The outlet opening is configured to, in particular smoothly, connect to a downstream component of the turbomachine, making it possible to provide for undisturbed, in particular laminar, flow guidance. The struts of the flow duct may be designed to guide and/or to direct the flow and/or may be configured to improve the quality of an oncoming flow for components disposed downstream in the direction of flow. In the context of the present disclosure, a leading edge is the edge of a strut or of a guide vane of the turbomachine that is upstream in the direction of flow, and, similarly, a trailing edge is an edge of a strut or of a guide vane of the turbomachine that is downstream in the direction of flow.

The guide vanes can each be part of a turbomachinery component, such as a compressor, i.e., a low-pressure compressor and/or a high-pressure compressor. For example, the upstream guide vanes may be a part of an outlet guide vane (OGV) assembly of a low-pressure compressor and the downstream guide vanes may be part of an inlet guide vane (IGV) assembly of a high-pressure compressor.

The meanline geometry can be described, for example, as a plane that is formed by rotation of a curve, in particular an S-curve, about the axis of rotation of the turbomachine, and may essentially have a bell shape. The meanline geometry may have a larger diameter at an upstream position in a direction of flow than at a downstream position in the axial direction, and a slope of the meanline geometry may be greater in an upstream region than in a downstream region. In some embodiments, the inlet opening and/or the outlet opening may be arranged perpendicular to this meanline geometry.

The idea underlying the present invention is to configure a flow duct in a way that allows shortening of the length of the flow duct and thus also of the turbomachine, which implies or results in an increased slope or steepness of the duct. Therefore, in accordance with the invention, there is proposed a cross-sectional ratio, in particular within predetermined limits, that makes it possible to provide a deceleration of the gas stream and, at the same time, to avoid flow separations and associated flow losses in the flow duct.

For this purpose, a length ratio of the flow duct is determined or specified, which is defined as the ratio of the axial length to the radial height of the flow duct, and a cross-sectional ratio, which is defined as the ratio of the cross-sectional area of the inlet opening to the cross-sectional area of the outlet opening. The axial length and the radial height of the flow duct are determined by two points of the flow duct. The first point is a point of intersection of the inlet opening with the meanline geometry, and the second point is a point of intersection of the outlet opening with the meanline geometry. The axial length extends from the first point to the second point in the axial direction, and the radial height of the flow duct extends from the first point to the second point in the radial direction. The cross-sectional area of the inlet opening and the cross-sectional area of the outlet opening are each defined in particular by an annular area that is radially bounded by the inner and outer circumferential surfaces of the flow duct. The meanline geometry of the flow duct extends between the guide vanes of the turbomachine that are located upstream and downstream of the flow duct, with each point of the meanline geometry being located on a normal, i.e. perpendicular, to the meanline geometry, centrally between the two circumferential surfaces of the flow duct.

If the length ratio and the cross-sectional ratio are in the proposed range, it is possible to achieve for the flow duct a geometry which, firstly, permits a reduction in an axial length of the flow duct and, secondly, can cause an, in particular suitable, deceleration of the gas stream, in particular in order to avoid (near-surface) separation of the gas stream in the flow duct and flow losses resulting therefrom.

In an embodiment, the proposed range of cross-sectional ratio and length ratio includes a first range in which the length ratio is between about 0.9 and about 1.1 and a second range in which the length ratio has a value between about 1.2 and about 1.5. The length ratio of the axial length to the radial height and the cross-sectional ratio of the cross-sectional area of the inlet opening to the cross-sectional area of the outlet opening are either in the aforementioned first range or in the aforementioned second range. These two ranges may determine a length ratio for the flow duct, which, in particular in conjunction with a suitable cross-sectional ratio described below, makes it possible to provide for a favorable flow guidance and enables a convenient axial length.

In some embodiments, the first range has a cross-sectional ratio of between about 1.05 and about 1.19, in particular between about 1.05 and about 1.11, or between about 1.11 and about 1.19. In some embodiments, the second region has a cross-sectional ratio of between about 1.02 and about 1.16, in particular between about 1.02 and about 1.10, and/or between about 1.10 and about 1.16. In this way, a suitable deceleration can be determined for the gas stream within the flow duct in accordance with its length ratio.

In some embodiments, the first range has a length ratio of between about 0.9 and about 1.05, in particular between about 0.95 and about 1.0, and/or between about 1.0 and about 1.1. In some embodiments, the second region has a length ratio of between about 1.23 and about 1.45, in particular between about 1.23 and about 1.3, and/or between about 1.3 and about 1.45. In this way, the length ratio can be selected such that a suitable axial length is achieved for the particular application of the flow duct.

Further features, advantages, and possible applications of the invention will be apparent from the following description taken in conjunction with the figures. In general, it holds that features of the various exemplary aspects and/or embodiments described herein can be combined with each other, unless explicitly excluded in connection with the disclosure. In particular, the ratios specified herein do not constitute hard limit values, below or above which the advantages according to the invention could not be attained. Rather, outside of these limits, the attainable advantages are smaller. The specified values define particularly suitable ranges, the disclosed boundary values of which are not excluded by the expression "between two values," but should each be understood to be part of the defined range.

BRIEF DESCRIPTION OF THE DRAWINGS

In the following part of the description, reference is made to the figures, which are shown to illustrate specific aspects and embodiments of the present invention. It is understood that other aspects may be utilized and structural or logical changes may be made to the illustrated embodiments without departing from the scope of the present invention. The following description of the figures should therefore not be construed to be limiting. In the drawings.

DETAILED DESCRIPTION

Figure 1:
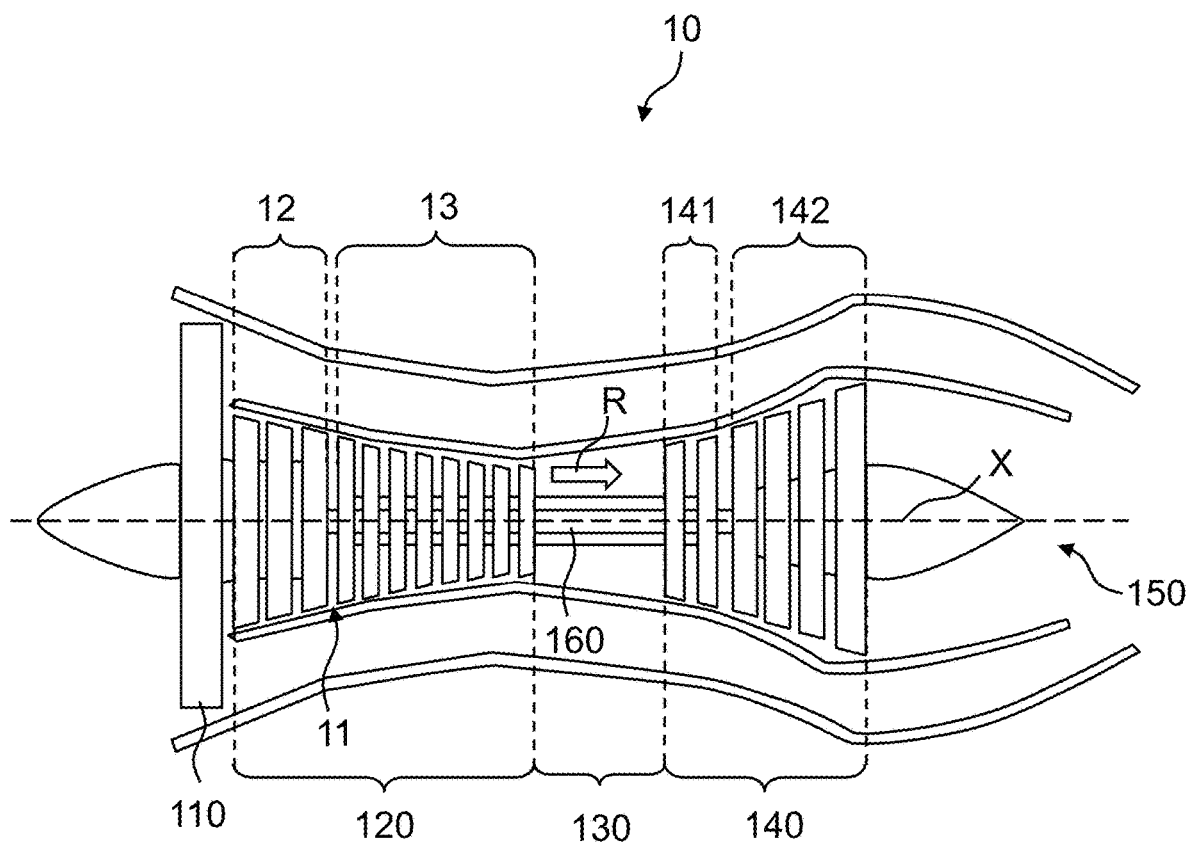
FIG. 1 is a schematic illustrative view of an exemplary turbomachine having a flow duct according to the present disclosure.

FIG. 1 schematically shows an exemplary embodiment of an inventive turbomachine 10 in a schematic sectional view.

The exemplary turbomachine 10 is configured as a geared turbofan engine as used in aircraft. Turbomachine 10 has a fan 110 with at least one fan stage, a compressor 120, a combustor 130, and a turbine 140, as well as an outlet nozzle 150 arranged in series along an axis of rotation X in the direction of flow R. Compressor 120 includes a low-pressure compressor 12 and a high-pressure compressor 13 arranged in series in the direction of flow R. Turbine 140 includes a high-pressure turbine 141 and a low-pressure turbine 142 arranged in series in the direction of flow R.

Low-pressure compressor 12 is configured to compress a gas stream drawn in by fan 110 before it enters high-pressure compressor 13 where further compression can take place. Formed between low-pressure compressor 12 and high-pressure compressor 13 is an exemplary flow duct 11, which will be described in more detail below.

The compressed air or gas stream exiting from high-pressure compressor 13 is fed into combustor 130, where it is burned with fuel. The hot combustion gases are expanded in high-pressure turbine 141 and in low-pressure turbine 142 before they exit through outlet nozzle 150, providing additional thrust. High-pressure turbine 141 and low-pressure turbine 142 may respectively drive high-pressure compressor 13, low-pressure compressor 12, and/or fan 110 via shaft devices 160.

Figure 2:
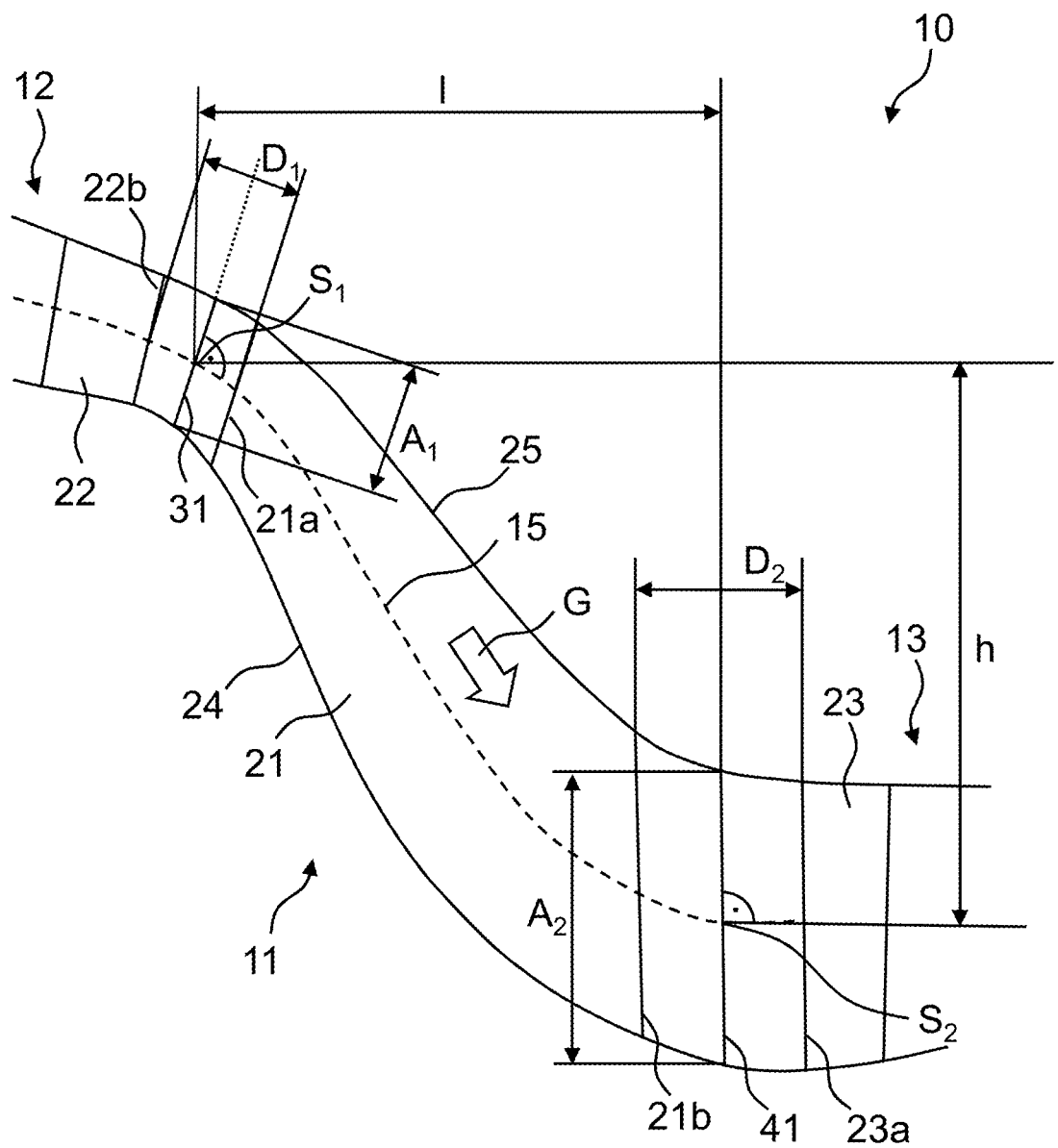
FIG. 2 is a schematic illustrative view of a portion of an exemplary turbomachine having a flow duct according to the present disclosure.

FIG. 2 shows a portion of an exemplary turbomachine 10 having an inventive flow duct 11 in a schematic sectional view in a plane containing the axis of rotation X of turbomachine 10.

The flow duct 11 of the illustrated exemplary embodiment is disposed between a low-pressure compressor 12 and a high-pressure compressor 13 of a compressor of turbomachine 10 and is configured to connect them in a manner that allows passage of a gas stream G therethrough. An annular inlet opening 31 and an annular outlet opening 41 of flow duct 11 are connected by an inner circumferential surface 24 and an outer inner circumferential surface 25. Inlet opening 31 and outlet opening 41 each have a respective cross-section or cross-sectional area $A_1$, $A_2$, each bounded by inner circumferential surface 24 and outer inner circumferential surface 25.

Flow duct 1 has a plurality of circumferentially distributed radially extending struts 21 disposed therein, one of these struts 21 being shown in the cross-sectional plane. A leading edge 21a of strut 21 is disposed at a distance $D_1$ from a trailing edge 22b of an upstream guide vane 22 of low-pressure compressor 12, which guide vane 22 is also shown in the cross-sectional plane. A trailing edge 21b of strut 21 is disposed at a distance $D_2$ from a leading edge 23a of a guide vane 23 of high-pressure compressor 13, which guide vane 23 is also shown in the cross-sectional plane.

Inlet opening 31 is located at half the distance $D_1$ between leading edge 21a of strut 21 and trailing edge 22b of guide vane 22 of low-pressure compressor 12, and outlet opening 41 of flow duct 11 is disposed at half the distance $D_2$ between trailing edge 21b of strut 21 and leading edge 23a of guide vane 23 of high-pressure compressor 13.

A meanline geometry 15 of flow duct 11 extends between guide vanes 22, 23, each point of meanline geometry 15 being equidistant from the inner and outer circumferential surfaces 24, 25 in the radial direction. Inlet opening 31 and outlet opening 41 are arranged perpendicular to this meanline geometry 15.

An axial length 1 of flow duct 11, with respect to the axis of rotation X of turbomachine 10, extends axially from a point of intersection $S_1$ of inlet opening 31 with meanline geometry 15 to a point of intersection $S_2$ of outlet opening 41 with meanline geometry 15. A radial height h of flow duct 11 extends radially from the point of intersection $S_1$ of inlet opening 31 with meanline geometry 15 to the point of intersection $S_2$ of outlet opening 41 with meanline geometry 15.

Figure 3:
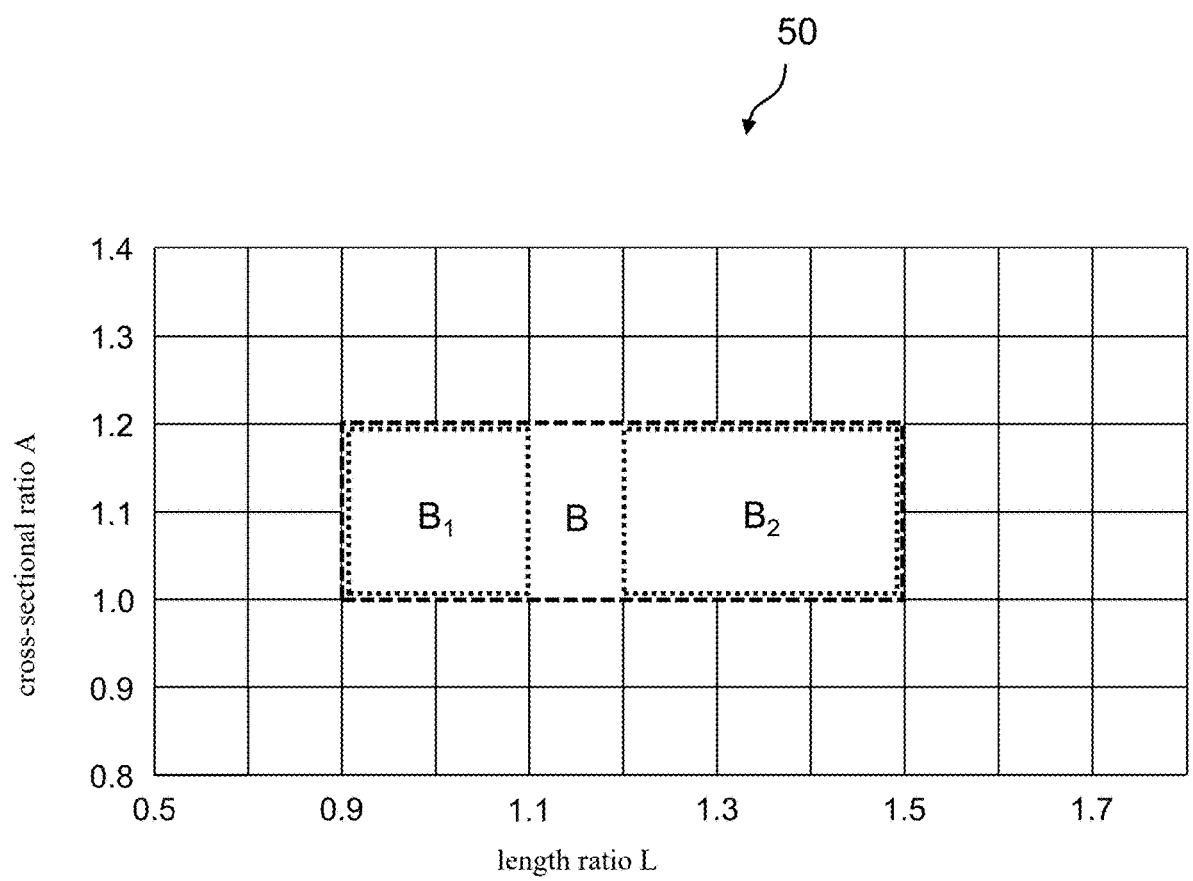
FIG. 3 is a schematic diagram of a cross-sectional ratio and a length ratio for a flow duct of an exemplary turbomachine according to the present disclosure.

FIG. 3 shows a schematic diagram 50 of a cross-sectional ratio A and a length ratio L for the flow duct 11 of the exemplary turbomachine 10 of FIG. 2.

Length ratio L of flow duct 11 is determined from a ratio of axial length 1 to radial height h (L=l/h), and cross-sectional ratio A is determined from a ratio of cross-sectional area $A_1$ of inlet opening 31 to cross-sectional area $A_2$ of outlet opening 41 ($A=A_1/A_2$). For a flow duct 11 of the present disclosure, length ratio L and cross-sectional ratio A are in a range B having a cross-sectional ratio A of between 1 and 1.2 and a length ratio L of between 0.9 and 1.5.

According to some embodiments, range B includes a first range $B_1$ and a second range $B_2$, the length ratio L of axial length 1 to radial height h and the cross-sectional ratio A of cross-sectional area $A_1$ of inlet opening 31 to cross-sectional area $A_2$ of outlet opening 41 being either in first range $B_1$ or in second region $B_2$ mentioned above. Length ratio L of first range $B_1$ may be between 0.9 and 1.1, between 0.95 and 1.05, between 0.9 and 1.0, or between 1.0 and 1.1. Cross-sectional ratio A of first range $B_1$ may be between 1.05 and 1.19, between 1.05 and 1.11, or between 1.11 and 1.19.

Length ratio L of second range $B_2$ may have be between 1.2 and 1.5, between 1.23 and 1.45, between 1.23 and 1.45, between 1.23 and 1.3, or between 1.3 and 1.45. Cross-sectional ratio A of second range $B_2$ may be between 1.02 and 1.16, between 1.02 and 1.10, or between 1.10 and 1.16.

Such combinations of length ratio L and cross-sectional ratio A make it possible to provide a flow duct 11 that enables a favorable interaction between a slope of the flow duct and a deceleration of the gas stream to improve an efficiency of turbomachine 11.

LIST OF REFERENCE CHARACTERS 10 turbomachine
11 flow duct
12 low-pressure compressor
13 high-pressure compressor
15 meanline geometry
21 strut
21a leading edge of a strut
21b trailing edge of a strut
22 guide vane
22b trailing edge of a guide vane
23 guide vane
23a leading edge of a guide vane
24 inner circumferential surface
25 outer circumferential surface
31 inlet opening
41 outlet opening
50 diagram
110 fan
120 compressor
130 combustor
140 turbine
150 outlet nozzle
160 shaft devices
l axial length of the flow duct
h radial height of the flow duct
A cross-sectional ratio
$A_1$ cross-sectional area of the inlet opening
$A_2$ cross-sectional area of the outlet opening
B range
$B_1$ first range
$B_2$ second range
$D_1$ distance
$D_2$ distance
G gas stream
L length ratio
R direction of flow
$S_1$, $S_2$ points of intersection
X axis of rotation of the turbomachine

What is claimed is:

1. A turbomachine comprising:

a flow duct with an annular inlet opening and an annular outlet opening, the inlet opening and the outlet opening being connected by an inner and an outer circumferential surface radially bounding the flow duct, the flow duct having a plurality of circumferentially distributed radially extending struts whose strut leading edges are spaced a distance apart from trailing edges of upstream guide vanes and whose strut trailing edges are spaced a distance apart from leading edges of downstream guide vanes, the inlet opening and the outlet opening of the flow duct respectively being located at half the distance between the strut leading edges and strut trailing edges and the leading and trailing edges of the adjacent guide vanes along a meanline geometry extending between the guide vanes, each point of the meanline geometry being equidistant from the inner and outer circumferential surfaces in a direction perpendicular to the meanline geometry, and an axial length of the flow duct, with respect to the axis of rotation of the turbomachine, extending axially from an inlet point of intersection of the inlet opening with the meanline geometry to an outlet point of intersection of the outlet opening with the meanline geometry, and a radial height of the flow duct extending radially from the inlet point of intersection to the outlet point of intersection, a length ratio being the axial length to the radial height and a cross-sectional ratio being the cross-sectional area of the inlet opening to the cross-sectional area of the outlet opening, the cross-sectional ratio being between 1 and 1.2 and the length ratio being between 0.9 and 1.5.

2. The turbomachine as recited in claim 1 wherein the length ratio is between 0.9 and 1.1 or between 1.2 and 1.5.

3. The turbomachine as recited in claim 1 wherein the length ratio is between 1.05 and 1.19.

4. The turbomachine as recited in claim 1 wherein the length ratio is between 1.05 and 1.11.

5. The turbomachine as recited in claim 1 wherein the length ratio is between 1.11 and 1.19.

6. The turbomachine as recited in claim 1 wherein the length ratio is between 0.9 and 1.05.

7. The turbomachine as recited in claim 1 wherein the length ratio is between 0.95 and 1.0.

8. The turbomachine as recited in claim 1 wherein the length ratio is between 1.0 and 1.1.

9. The turbomachine as recited in claim 1 wherein the cross-sectional ratio is between 1.02 and 1.16.

10. The turbomachine as recited in claim 1 wherein the cross-sectional ratio is between 1.02 and 1.10.

11. The turbomachine as recited in claim 1 wherein the cross-sectional ratio is between 1.10 and 1.16.

12. The turbomachine as recited in claim 1 wherein the length ratio is between 1.23 and 1.45.

13. The turbomachine as recited in claim 1 wherein the length ratio is between 1.23 and 1.3.

14. The turbomachine as recited in claim 1 wherein the length ratio is between 1.3 and 1.45.

15. The turbomachine as recited in claim 1 wherein the flow duct is configured to connect at least two components of a turbomachine through which components a gas stream can flow.

16. The turbomachine as recited in claim 1 wherein the flow duct is configured to connect two compressors of the turbomachine.

17. The turbomachine as recited in claim 1 wherein the flow duct is configured to connect a high-pressure compressor and a low-pressure compressor of the turbomachine, disposed upstream of the high-pressure compressor in the direction of flow.

18. The turbomachine as recited in claim 1 wherein the inlet opening is arranged perpendicular to the meanline geometry.

* * * * *